United States Patent [19]

Baluteau

[11] 4,397,530
[45] Aug. 9, 1983

[54] OBJECTIVE WITH SEVERAL FIELDS

[75] Inventor: Jean-Michel Baluteau, Livry-Gargan, France

[73] Assignee: Societe d'Optique, Precision Electronique et Mecanique, Paris, France

[21] Appl. No.: 183,970

[22] Filed: Sep. 3, 1980

[30] Foreign Application Priority Data

Sep. 7, 1979 [FR] France .................. 79 22490

[51] Int. Cl.³ .......................................... G02B 23/08
[52] U.S. Cl. .................................. 350/541; 350/559
[58] Field of Search ............. 350/20, 25, 33, 34, 350/38, 52, 422

[56] References Cited

U.S. PATENT DOCUMENTS

| | | | |
|---|---|---|---|
| 1,445,284 | 2/1923 | Bell et al. | 350/52 X |
| 2,906,172 | 9/1959 | Klemt | 350/422 |
| 2,978,956 | 4/1961 | Howell | |
| 3,407,302 | 10/1968 | Bouwers | 350/34 X |
| 3,549,231 | 12/1970 | Scidmore et al. | 350/34 X |

FOREIGN PATENT DOCUMENTS

| | | |
|---|---|---|
| 98250 | of 0000 | Fed. Rep. of Germany. |
| 237072 | of 0000 | Fed. Rep. of Germany. |
| 1087366 | 8/1960 | Fed. Rep. of Germany ........ 350/20 |
| 1220165 | of 0000 | Fed. Rep. of Germany. |
| 1272741 | of 0000 | United Kingdom. |

Primary Examiner—John K. Corbin
Assistant Examiner—Matthew W. Koren
Attorney, Agent, or Firm—Pollock, Vande Sande & Priddy

[57] ABSTRACT

An objective providing at least two fields of view and/or of surveillance from a single sighting axis dividing into two channels over one of which two magnifications and different fields can be obtained. The objective comprises a set (31) of at least one lens centered on a common optical axis (41) and, behind this set, with respect to the direction of propagation of the light, a reflector element (5). A movable component (61) constituted by at least one lens is movable between, on the one hand, a position between the set (31) of lenses and the reflector element (5) so as to be centered on the common optical axis, and, on the other hand, a position located after the reflector element (5) so as to be centered on the optical axis (43) symmetrical with the common optical axis (41) with respect to the reflecting surface of the reflector element (5). An instrument for viewing and/or surveillance, such as a periscope, can be equipped with this objective.

10 Claims, 3 Drawing Figures

4,397,530

OBJECTIVE WITH SEVERAL FIELDS

FIELD OF THE INVENTION

The present invention relates to an objective providing at least two fields of view and/or of surveillance from a single sighting axis dividing into two channels, over one of which two magnifications and different fields can be obtained. This objective can equip an instrument for viewing and/or surveillance such as a periscope.

BACKGROUND

A periscope comprises a head prism which is pivotable, for sighting, about a horizontal axis and which deviates light coming from viewed objects towards an objective disposed in the upper part. After the objective, the beam of light passes through a set of image-conveying media. The beam of light is then reflected, at the foot of the periscope, at one or several reflectors, towards one or several eyepieces.

Equipping periscopes with two objectives, one adapted to day viewing and the other to night viewing, has been tried. These two objectives are then centered on two parallel and separate optical axes. The images given by these two objectives are then collected by the set of image-conveying media which is common to the two channels. The space these objectives occupy is a disadvantage in making a submarine periscope head.

SUMMARY OF THE INVENTION

The subject of the present invention is an objective providing at least two fields of view or surveillance with a single sighting axis, one of these fields being relatively small and corresponding to a high magnification, the other field being relatively large and corresponding to a low magnification. The advantage of the common sighting axis is that it requires only a single aiming prism for sighting. In particular, the objective allows three separate fields to be obtained with a single sighting axis via two channels, over one of which two different fields can be obtained. Because it needs only a single head prism, this objective consequently takes up very little space. It can be incorporated in a periscope with one sighting channel allowing night viewing and the other channel providing two different magnifications and allowing day viewing.

The objective according to the invention comprises a set of at least one lens centered on a common optical axis and, behind this set, with respect to the direction of propagation of the light, a reflector element and it is essentially characterized by the fact that it includes a medium constituted by at least one lens and capable of being moved between, on the one hand, a position between the set of lenses and the said reflector element so as to be centered on the common optical axis and, on the other hand, a position located after the said reflector element so as to be centered on the optical axis symmetrical with the common optical axis with respect to the reflecting surface of the reflector element.

In order that the invention may be more clearly understood, reference will now be made to the attached drawings, wherein an embodiment of the invention is shown for purposes of illustration.

DETAILED DESCRIPTION

Figure 1:
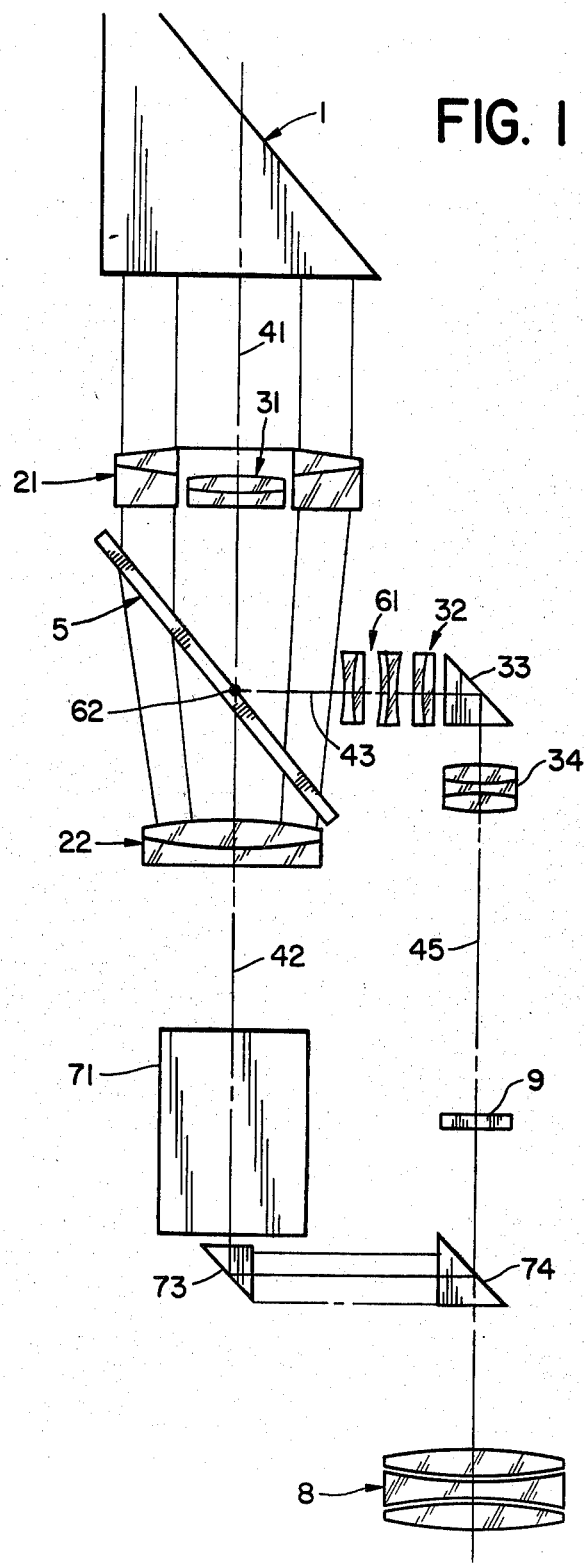
FIG. 1 is a diagrammatic view of the objective according to the invention.
Figure 2:
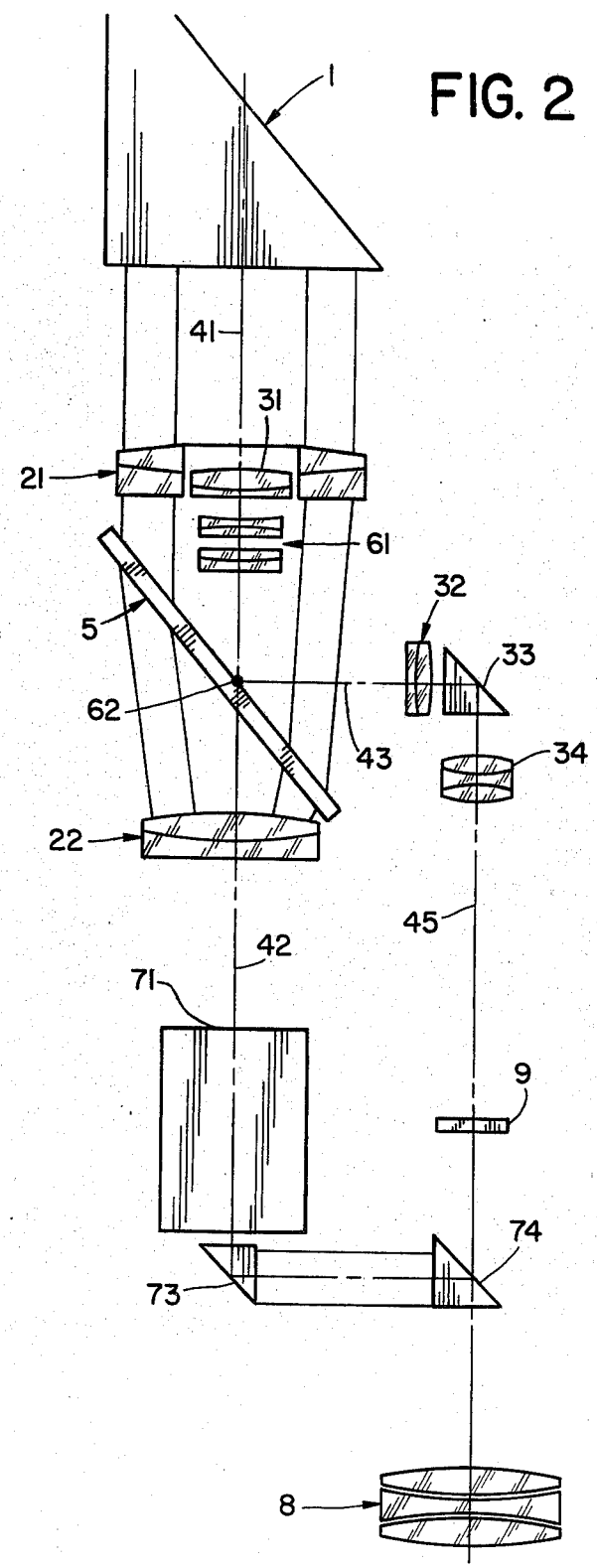
FIG. 2 is a view of the objective of FIG. 1 showing the movable medium in a different position.

The objective represented by FIGS. 1 and 2 is mounted in a periscope comprising, at the top, a prism 1 which can pivot, for sighting, about a horizontal axis. The objective is disposed behind this head prism 1 with respect to the direction of propagation of the light. It has an optical system for day viewing comprising a front set 31 of at least one lens and a rear set 32 of at least one lens. One set of lenses at least, such as 34, is disposed behind the set 32. The objective also includes an optical system for night viewing comprising a set 21 of at least one lens and a rear set 22 of at least one lens. The set 22 can also be followed by a set of lenses, if necessary. The two front sets 21 and 31 are centered on the common optical axis 41. The front set 21 of the objective for night viewing is constituted by annular lenses which form a location in which the front set 31 of the objective for day viewing is disposed. In the embodiment represented by the drawings, each of the two sets 21 and 31 is constituted by a doublet formed of a converging lens coupled with a diverging lens.

The objective includes a reflector element 5 which reflects the light beam from one of the viewing channels. This reflector element is located after the front set 31 of the objective for day viewing. It is equipped with a reflecting surface 51. This reflecting surface reflects the light beam coming from the front set 31. This reflecting surface therefore has a substantially elliptical shape centered on the common optical axis 41. This reflecting surface is preferably inclined at 45° with respect to the common optical axis 41. This reflector element 5 is preferably constituted by a thin plate 52 with parallel faces on which a localized reflecting deposit 51 has been laid, centered on the common optical axis 41.

The front set 31 of the optical system for day viewing cooperates with a rear set 32 composed of at least one lens. This rear set 32 is centered on the axis 43 which is symmetrical with the axis 41 with respect to the normal to the reflecting surface of the reflector element 5. The front set 21 of the optical system for night viewing cooperates with a rear set 22 which is constituted by at least one lens. This set 22 is centered on the optical axis 42 which is parallel and substantially aligned with the common optical axis 41. In the embodiment represented by the attached figures, each rear set 22 or 32 is constituted by a doublet formed by a converging lens coupled with a diverging lens. Each set 22 or 32 is located behind the reflector element.

The objective includes a medium 61 of negative power, comprising at least one lens. This medium is more precisely constituted by two diverging doublets each formed of a diverging lens and a converging lens. This medium is capable of being moved between, on the one hand, a position between the front set 31 of lenses and the reflector element 5 so as to be centered on the optical axis 41 and on the other hand a position located after the said reflector element 5 so as to be centered on the optical axis 43. More precisely, when the movable medium 61 is centered on the axis 43, it occupies a position between the reflector element 5 and the rear set 32 of the objective for day viewing. It will be noted that the medium is the only lens between the set 31 and the reflector 5 or between the latter and the set 32. Movement of the movable medium 61 is effected by rotation about an axis 62 of rotation passing through the point of coincidence of the optical axes 41 and 43 and perpendicular to these optical axes 41 and 43. This axis 62 of rotation is parallel to the reflecting surface of the reflector element and more precisely is contained in the plane of this reflecting surface. The distances between the movable medium 61 and the axis 62 of rotation corresponding respectively to the position centered on the axis 41 and the position centered on the axis 43 are equal.

Figure 3:
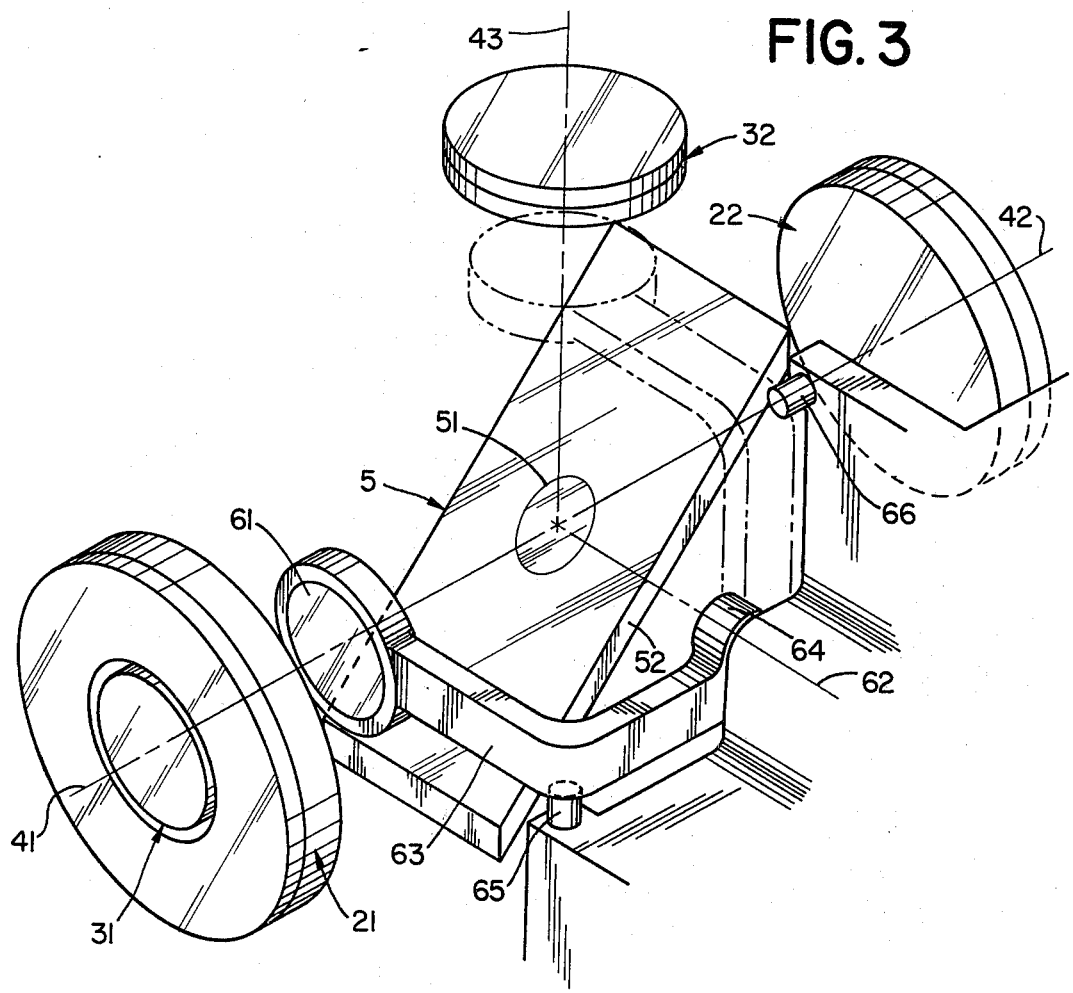
FIG. 3 is a detailed view of an embodiment of a mechanism allowing the movable medium to be moved.

FIG. 3 represents an embodiment of the rotation mechanism for the movable medium. The medium 61 is housed in a mounting solid with a bent arm 63. This arm is guided by an articulation 64 whose axis 62 is perpendicular to 41 and 43. This articulation 64 is disposed so as to be set off with respect to the optical axis 41 and with respect to the reflector element 5 so as not to reduce the field of the objective. The rotary movement of the arm 63 is limited by adjustable stops 65 and 66 which determine the two positions of the medium 61 centred on the axes 41 and 43.

A light-intensifying tube 71, centered on the optical axis 42, is positioned behind the rear set 22 of the objective for night viewing. The light beam is then reflected by the reflectors 73 and 74. In the embodiment represented by the drawings, these reflectors are constituted, for example, by right-angled isosceles triangle prisms termed "total reflection prisms". The reflector 74 is retractable so as to clear the day viewing channel. If necessary, the reflector 73 can be retracted at the same time as the reflector 74.

Behind the rear set 32 of the objective for day viewing, the light beam is reflected by a reflector 33 towards the reflector 74. The two reflectors 33 and 74 are aligned along the optical axis 45 parallel to the optical axis 41. The image given by the day viewing channel passes through the reflector 74 constituted by a total reflection prism. Behind the prism 74, the night viewing channel and the day viewing channel follow through a common optical system. This common optical system is constituted by the set of the media and of the eyepiece unit and it has a set 8 of lenses in front which is centered on the optical axis 45. A micrometer 9 is disposed on the day viewing channel. The optical distances between the set 8 and the exit of the tube and between the set 8 and the reticle 9, respectively, are equal.

The principle of operation and the optical characteristics of the objective whose practical embodiment has just been described will now be explained in detail.

The light beam which passes through the front wall set 31 of central lenses is reflected by the reflecting surface of the reflector 5. The reflected beam is directed towards the rear set 32. The light beam has to pass through the medium 61 which is positioned either on the optical axis 41 between the reflector 5 and the front set 31 or on the optical axis 43 between the reflector element 5 and the rear set 32. Behind the rear set 32, the beam is reflected by the reflector 33 towards the set 8.

The light beam which passes through the front set 21 of annular lenses passes through the thin plate 52 with parallel faces without being reflected by the reflecting surface 51. Behind the reflector element 5, the beam passes through the rear set 22 from which it is focussed on the inlet of the light-intensifying tube 71. The night viewing optical axis is merged with the day viewing optical axis 45, in front of the set 8, by means of the reflectors 73 and 74.

The movable medium 61 which is involved in day viewing moves from the position between the reflector element 5 and the front set 31 (FIG. 2 and the representation in full line of FIG. 3) and a position between the reflector element 5 and the rear set 32 (FIG. 1 and the representation in dotted lines of FIG. 3). When the medium 61 is in front of the reflector element 5 and centered on the common optical axis 41, magnification is relatively small and the field relatively large. Conversely, when the medium 61 is behind the reflector element 5 so as to be centered on the reflected optical axis 43, magnification is relatively high and the field relatively small. The magnifications of the medium 61 which correspond respectively to the position in front of the reflector element 5 and the position behind the reflector element 5 have reciprocal values. When the medium 61 occupies either of the two positions, the object plane and the image plane (conjugate planes) relating to this medium are fixed.

In the case of day viewing, the reflector 74 is retracted, change in magnification being effected by rotating the medium 61. When a change to night viewing is required, the reflector 74 has to be positioned on the axis 45 and the medium 61 has to be retracted to the axis 43 where it does not block night viewing.

What is claimed is:
1. Objective comprising
   (a) at least one set (21, 31) of at least one lens centered on a common optical axis (41);
   (b) a fixed reflector element (5) located downstream of this set, with respect of the direction of propagation of the light, so as to reflect a light beam coming from said set (21, 31) along an optical axis (43) towards at least one optical element (32, 33, 34, 9, 8) of a first channel, said reflector permitting the passage of a light emanating from said set (21, 31) towards at least one optical element (22, 71, 73, 74, 8) of a second channel;
   (c) a movable component (61) comprising at least one lens and means for moving this component between a position located between said set (21, 31) of at least one lens and said reflector element (5) where it is centered on the said common optical axis (41), and a position located downstream of said reflector element (5) where it is centered on the said optical axis (43) of said second channel.

2. Objective according to claim 1, wherein said movable component (61) is associated with a mechanism for oscillation about an axis (62) of rotation passing through the point of coincidence of said common optical axis (41) and the reflected optical axis (43) on said reflector element (5) and perpendicular to these axes (41-43).

3. Objective according to claim 2, wherein, for the two positions of said movable component (61), the conjugate planes relating to said component are fixed.

4. Objective according to claim 3, wherein said movable component has a negative power.

5. Objective according to any one of the preceding claims, wherein said reflector element (5) is provided with a localized reflecting surface (51) so as to reflect a light beam which has passed through said set of lenses (21, 31) and to allow the passage of a light beam without reflection.

6. Objective according to claim 5, comprising a set (21) of annular lenses centered on the common optical axis (41) which form a location in which is housed a set (31) of lenses centered on said common optical axis, the reflecting surface of said reflector element (5) being centered on the common optical axis (41) so as to reflect the light which has passed through the set of lenses (31) housed in the set of annular lenses (21).

7. Objective according to claim 6, comprising a set (22) of lenses located downstream of said reflector element (5) and centered on the same common optical axis (41), and a set (32) of lenses located downstream of said reflector element (5) on the optical axis (43) of said first channel.

8. Objective according to any one of claims 1 to 4, comprising a light-intensifying tube (71) positioned downstream of said reflector element (5).

9. Objective according to any one of claims 1 to 4, wherein said movable component (61) is mounted on an arm (63) rotatably guided by an articulation (64-62) set off from the common optical axis (41) and whose rotary movements are limited by adjustable stops (65-66) determining the two positions.

10. Objective according to any one of claims 1 to 4, wherein said component (61) comprises two diverging doublets.

* * * * *